United States Patent [19]

Brueggemann

[11] Patent Number: 4,624,528
[45] Date of Patent: Nov. 25, 1986

[54] SCANNING SYSTEMS WITH POLYGON SCANNER HAVING CURVED FACETS

[75] Inventor: Harry P. Brueggemann, San Marino, Calif.

[73] Assignee: Xerox Corporation, Stamford, Conn.

[21] Appl. No.: 703,970

[22] Filed: Feb. 21, 1985

[51] Int. Cl.⁴ ............................................. G02B 26/10
[52] U.S. Cl. ..................................................... 350/6.7
[58] Field of Search ................... 350/6.4, 6.5, 6.6, 6.7, 350/6.8, 6.9

[56] References Cited

U.S. PATENT DOCUMENTS

| | | |
|---|---|---|
| 3,520,586 | 7/1970 | Bomsky . |
| 3,897,132 | 7/1975 | Meeussen . |
| 3,909,105 | 9/1975 | Neiswander . |
| 4,002,830 | 1/1977 | Brown . |
| 4,049,945 | 9/1977 | Ehlscheid et al. ................... 350/6.5 |
| 4,132,590 | 1/1982 | Harbaugh . |
| 4,202,597 | 5/1980 | Moore . |
| 4,247,160 | 1/1981 | Brueggemann . |
| 4,268,110 | 5/1981 | Ford . |

FOREIGN PATENT DOCUMENTS 2053505  2/1981  United Kingdom ................. 350/6.6

OTHER PUBLICATIONS

Proc. SPIE Optical Systems Engineering, vol. 193, pp. 202–208 (179).

*Primary Examiner*—John K. Corbin
*Assistant Examiner*—Loha Ben

[57] ABSTRACT

A raster scanner system having double reflection from polygon facet surfaces which have aspheric curvature. In addition to providing a scan which is free of astigmatism and bow, the aspheric surfaces provide the scan and focus functions of conventional scan lens optics.

5 Claims, 1 Drawing Figure

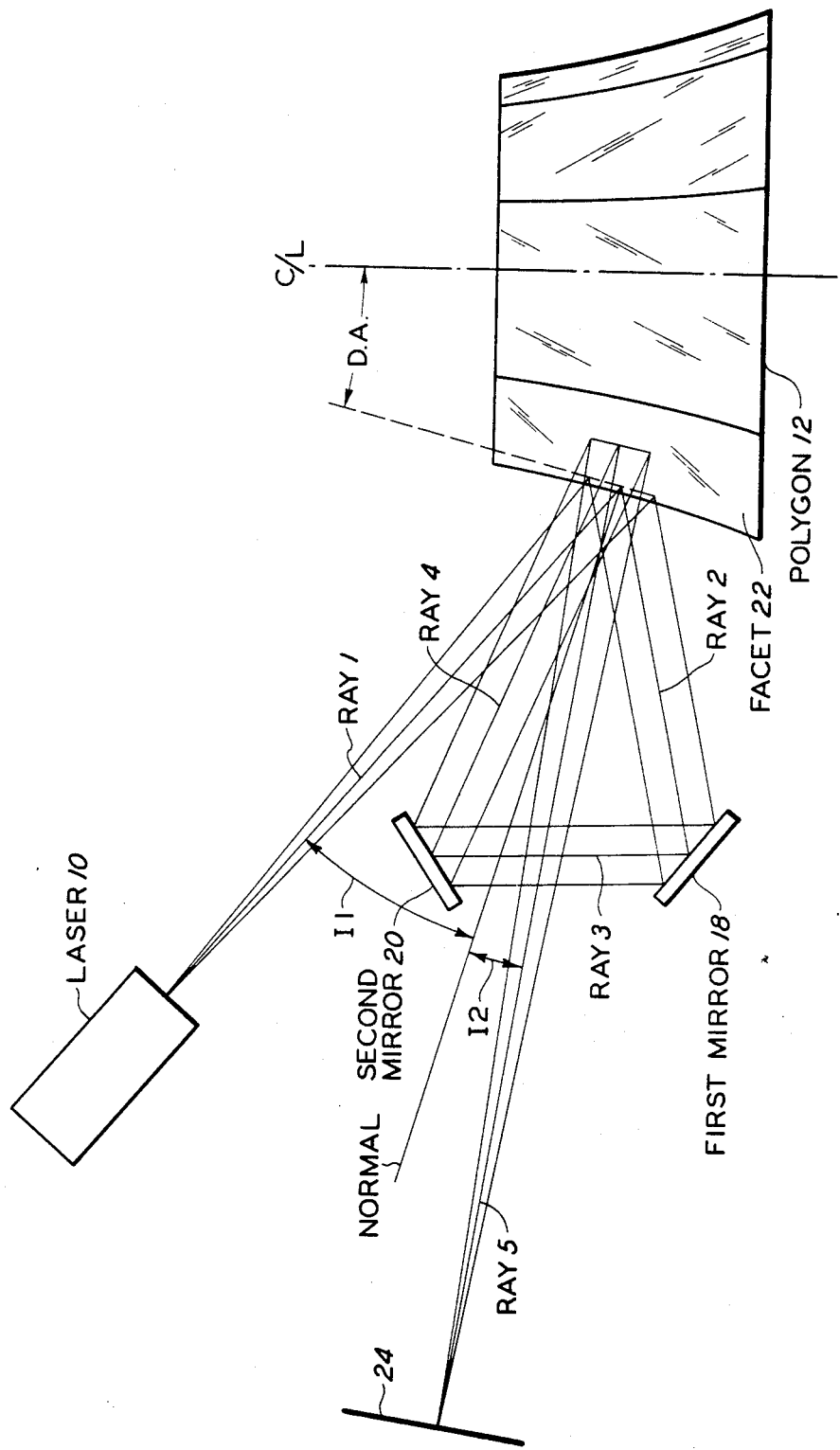

SCANNING SYSTEMS WITH POLYGON SCANNER HAVING CURVED FACETS

BACKGROUND OF THE INVENTION

Many modern day raster output scanners and raster input scanners utilize a rotating polygon having flat reflective surfaces or facets, in parallelism with the axis of rotation of the polygon. Rotational movement of such facets causes the reflected light of an incident, collimated beam to appear to revolve about an axis halfway between the center of rotation of the polygon and the facet. Such scanning systems often suffer from the effects of wobble, introduced into the system by inaccuracies in the bearings utilized to impart motion to the polygon and inaccuracies in the grinding and positioning of the actual facets on the faces of the polygon. The wobble effects cause an uneven raster scan which produces irregular locations of the output scan lines whether utilized in an input or an output fashion.

Cancellation of wobble by double reflection from the flat, parallel facets of a polygon, as proposed by U.S. Pat. No. 3,897,132, eliminates wobble but introduces excessive bow effects. U.S. patent application Ser. No. 532,323, filed Sept. 15, 1983, in the name of the same inventor and assignee of the present application, discloses a polygon scanning system for correcting wobble by double reflection from the active polygon facet, with the wobble correction being achieved without bow defects. Instead of the impinging light beam being transverse to the axis of rotation of a rotating polygon having facets in parallelism to the axis of rotation of the polygon, there is disclosed a rotating polygon with facets having a predetermined draft angle with the axis of rotation of the polygon, and a light beam impinging on the facets. Once again, by two further reflections from flat, fixed mirrors, the light beam is made to reimpinge upon the same facet; correcting wobble, but now with no effects of bow.

In such systems, after the second facet reflection the light beam is passed through conventional scan lens optics having appropriate power in the tangential plane, such that the scanning light beam is linearized and focused at the surface to be scanned. It would be advantageous to eliminate the scan lens optics, the advantage being not only a reduction in the component count, but also, if the function of the scan lens optics could be achieved by reflective surfaces or mirrors, the entire optical train would consist only of mirrors and thus have the same focus and scan characteristics at any wavelength.

Flat faceted polygons are made of metalized glass or solid metal. Such polygons cannot be made by injection molding using acrylic plastics, for example, because the surface tension of molten plastic is indeterminate for a flat surface and accordingly a facet cannot be made flat to sufficient accuracy. It would be desirable to have a polygon scanner that could be made by injection molding. Also, it would be beneficial if the injection molded polygon could achieve the function of the scan lens optics, the advantage being not only a reduction in the number of components, but also, if the function of the scan lens optics could be achieved by reflective surfaces, the entire optical plane could consist only of reflective surfaces and thus have the same focus and scan characteristics at all wavelengths, making the scanner usable with any color laser or light source.

SUMMARY OF THE INVENTION

A raster scanner system having double reflection from polygon facet surfaces which have aspheric curvature. In addition to providing a scan which is free of astigmatism and bow, the aspheric surfaces provide the scan and focus functions of conventional scan lens optics.

DETAILED DESCRIPTION OF THE INVENTION

It is proposed that, instead of being flat, the facets of a raster input scanner or raster output scanner polygon have curvature or optical power. Such facet curvature could provide the function of the scan lens optics and hence such optics could be eliminated from the scanner system, thereby providing an all reflective surface scanner system usable with light of all wavelengths.

In choosing the curvature or power of the rotating polygon facets, possible performance features are spherical aberration, coma, astigmatism, field curvature, bow and wobble correction. For a three mil spot at the photosensitive surface of the scanning system, spherical aberration is negligible, and coma is usually small enough to be ignored; but astigmatism, field curvature, bow and wobble correction remain important performance features.

Bow can be corrected by the method described in U.S. patent application, Ser. No. 532,323. When the facet is the only optical element with power in the path of the scanning beam, wobble is corrected by designing the beam to be collimated in the cross-scan plane, between the two facet reflections. This is done by placing the source of the beam at the front focus of the facet in the cross-scan plane. The optical power of the curved facet depends on the angle of incidence of the beam, as well as the curvature in the cross-scan plane at the point of the first reflection. Then the source must be located at a distance D ahead of the first reflection, where D is $\cos(I)/(2*C)$, I being the angle of incidence in the cross-scan plane at the center of scan, and C being the curvature of the facet in the cross-scan plane at the point of the first reflection.

Astigmatism is corrected by the following method. It is known that a conicoidal mirror is free of astigmatism at any field angle, if the chief ray of the beam passes through the point of the conicoid described in analytic geometry as the "focus" of the conicoid. The reflected chief ray necessarily goes through the other "focus". For proof of this anastigmatic condition see Brueggemann, H. P., "Conic Mirrors", Chapter I, The Focal Press (London) 1968. If the angle of incidence is now changed so that the chief ray no longer passes through a "focus", the beam will have astigmatism; since the tangential focus decreases with angle of incidence while the sagittal focus increases [see Jenkins, F. A., and White, H. E., "Fundamentals of Optics", p. 95, McGraw Hill Book Co. (New York) 1957]. Note that the word focus has two meanings here. Enclosed in quotes, it means the geometric "focus" of a conicoid. Without quotes, it means the optical focus of the beam. Change the angle of incidence in the tangential plane so that the chief ray no longer passes through the "focus", and the beam has astigmatism of some sign, say positive. Now move the chief ray back towards the "focus", and astigmatism will decrease. When the chief ray passes through the "focus", astigmatism will be zero. After the chief ray moves beyond the "focus", astigmatism will be negative. Thus, when the chief ray moves from one side of the "focus" to the other, astigmatism changes from one sign to the other, by going through zero. Furthermore, from the same starting and ending points, by any change of the angle of incidence in both the tangential and sagittal planes so that the chief ray never goes through a "focus", astigmatism will always go through a value of zero. Thus there is a continuum of chief ray positions for which astigmatism is zero. However, this continuum does not necessarily describe a straight line when the the beam is used to write on flat paper, as in a raster scanner. In general, a scanner with only one reflection from a conicoidal mirror can be free of astigmatism but will have bow.

This invention has two reflections from the facet. At the first reflection, the beam passes on one side of the "focus", and at the second reflection on the other side. The beam acquires astigmatism of one sign at the first reflection, and of the opposite sign at the second reflection. The angles of incidence can be chosen so that the two signs cancel each other over the entire scan. With one reflection there is only one continuum which is free of astigmatism. With two reflections there is an infinity of different angles of incidence at each reflection which cancel astigmatism over the scan. It is possible to find among this infinity at least one combination of angles of incidence which have no astigmatism and also no bow.

The curvature of the polygon facets cannot be spherical because spherical surfaces do not make available enough design parameters to control all of the aforenoted important performance features of interest. It is proposed that the polygon facets have surfaces which are rotationally symmetrical but not spherical, that is aspheric surfaces which are astigmatic with two curvatures in two orthogonal planes. Exemplary of such aspheric surfaces for the polygon facets would be a conicoid or a toroid, although the aspheric surface could be any shape having the form:

$$Z = \frac{ch^2}{1 + [1 - (1 + k)c^2h^2]^{\frac{1}{2}}} + Ah^4 + Bh^6 + Ch^8 + Dh^{10}$$

where, in rectangular coordinates
Z = the sag of the surface
$h^2 = x^2 + y^2$
c = the curvature at the pole of the surface
A, B, C, D = $4^{th}, 6^{th}, 8^{th}, 10^{10th}$ order deformation terms.

The conicoidal shape is preferred over the toroidal shape because it is almost impossible to find for a toroidal shape more than one combination of angle of incidence and toroid orientation which is free from astigmatism, or has a given amount of astigmatism.

A conic mirror is completely described by two parameters. For a mathematical description of a conicoid these are usually taken as "a" and "b", the major and the minor axes respectively. However, these parameters require a separate equations for the ellipsoid and the hyperboloid, one equation cannot describe both. The parameters used here are "$r_k$" and "e", the radius of curvature at the apex (pole) of the conicoid, and the eccentricity, respectively. Than $a^2 = r_k/(1-e^2)^2$ and $b^2 = r_k^2/(1-e^2)$. Notice that $b^2$ can be negative if $e^2$ is greater than unity, which is the condition for the hyperboloid. Thus, one equation can describe both the ellipsoid and the hyperboloid, and a general mathematical description of a conicoid is greatly simplified.

In the above description, the conic section is rotated about the major axis "a", to obtain the conicoid. This is also called a prolate spheroid. An oblate spheroid, which is an ellipse rotated about its minor axis, is not included in this astigmatism equation, because it has the same limitation as the toroid; namely, there can be no more than one combination of angle of incidence and orientation which is free of astigmatism.

An example of the scanning system disclosed in seen in FIG. 1. Polygon 12 is rotated, at a constant angular velocity, about a line denoted as center line (C/L) by a conventional drive motor arrangement (not shown). This polygon could have any number of aspheric surface facets, while for this application, the rotating polygon has an even number of distinct facets, for example, 8. Rather than having each facet parallel to the axis of rotation, or the center line, as in conventional scanning systems using zero draft angle polygons, the polygon facets are tilted toward the center line at an angle denoted as the "draft angle" (D. A.). Impinging upon one facet 22 of the rotating polygon 12, at an angle $I_1$ to the normal to facet 22, is light from a light source such as, for example, a laser 10. Although polygon 12 is shown as having externally reflecting facets, a polygon having internally reflecting facets could be used. No optics are shown between laser 10 and facet 22 for ease of illustration, but certain optics could be necessary depending upon the type of laser chosen. Ray 1 coming from the laser 10 is co-planar with the center line, and is directed to facet 22 of rotating polygon 12. The light strikes the aspheric surface facet 22 and is reflected off with the angle of reflection equalling the angle of incidence.

After the light is reflected by facet 22, it travels to first flat mirror surface 18. Thus, ray 2 is ray 1 reflected by facet 22. Whereas ray 1 is stationary in space regardless of the position of the polygon 12, ray 2 rotates as the polygon rotates. Mirror surface 18 must be large enough in the direction perpendicular to the plane of FIG. 1 so that ray 2 strikes it at all times during the active scan of facet 22. Ray 2 is reflected from mirror surface 18, and is shown as ray 3. From the surface 18 the ray 3 travels to second flat mirror surface 20, from which it is reflected as ray 4, as seen in FIG. 1. Since ray 3 is rotating at the same angular rate as ray 2, the mirror surace 20 must be even larger than surface 18 to reflect ray 3 during active scan, because surface 20 is optically further from the facet 22 than surface 18. Ray 4 now travels back to facet 22, still with the same angular rate it had after being reflected from facet 22 as ray 2. Since the facet 22 is rotating, and ray 4 is also moving in the same direction as the facet 22, facet 22 need not be as large as mirror surface 20. The spacing between mirrors 18 and 20, and facet 22, must be kept small so that the mirrors and facet do not become too large. One skilled in the art of designing underfilled facet scanners will know how to choose the correct values of the laser beam parameters, so that the mirrors and the polygon do not become too large.

Ray 4 has many angles of incidence with facet 22 during the scan, because it rotates as the polygon rotates. After reflection again by facet 22, ray 4 becomes ray 5, which is at an angle $I_2$ to the normal to facet 22 and which is focused at photosensitive surface 24. The beam is collimated after the first facet reflection, and focused at surface 24 after the second facet reflection.

Since polygon 12 has facets with aspheric surfaces, polygon 12 can be made by injection molding, using, for example, acrylic plastic. Thus, in addition to being cost effective from the standpoint of less system components, the scanning system disclosed is cost effective also from the standpoint of discrete component manufacture.

What is claimed is:

1. In a light scanning system including a multi-surface mirror assembly having an axis of rotation, including a light source for introducing a source of light toward said multi-surface mirror assembly, said light being reflected in turn by each of said surfaces of said mirror assembly, a first fixed mirror placed in the path of said reflected light from said multi-surface mirror assembly, a second fixed mirror placed in the path of said reflected light from said first mirror, said second mirror reflecting said light back to the same surface of said rotating multi-surface mirror assembly for a last reflection, said last reflection being a scanning light beam of predetermined range of arc of one rotation of said multi-surface mirror assembly, the improvement comprising said multi-surface mirror assembly comprising a polygonal array of non-planar mirror facets, said mirror facets having a predetermined draft angle with respect to the axis of rotation of said multi-surface mirror assembly.

2. The scanning system of claim 1 wherein said non-planar mirror facets have aspheric surfaces.

3. The scanning system of claim 2 wherein said aspheric surfaces are astigmatic with two curvatures in two orthogonal directions.

4. In a light scanning system a multi-surface mirror assembly having an axis of rotation, including a light source for introducing a source of light toward said multi-surface mirror assembly, said light being reflected in turn by each of said surfaces of said mirror assembly, a first fixed mirror placed in the path of said reflected light from said multi-surface mirror assembly, a second fixed mirror placed in the path of said reflected light from said first mirror, said second mirror reflecting said light back to the same surface of said rotating multi-surface mirror assembly for a last reflection, said last reflection being a scanning light beam of predetermined range of arc of one rotation of said multi-surface mirror assembly, the improvement comprising said multi-surface mirror assembly comprising a polygonal array of mirror facets having aspheric surfaces, said mirror facets having a predetermined draft angle with respect to the axis of rotation of said multi-surface mirror assembly.

5. The scanning system of claim 4 wherein said aspheric surfaces are of conicoidal shape.

* * * * *